United States Patent [19]

Umeyama et al.

[11] Patent Number: 5,164,438

[45] Date of Patent: Nov. 17, 1992

[54] RESIN COMPOSITION HAVING OXYGEN BARRIER QUALITY

[75] Inventors: Hiroshi Umeyama; Toshikazu Katoh; Katsuhiko Kimura; Katsuyuki Ohno; Tatuo Furuse, all of Tokyo, Japan

[73] Assignee: Toppan Printing Co., Ltd., Tokyo, Japan

[21] Appl. No.: 736,872

[22] Filed: Jul. 29, 1991

[51] Int. Cl.$^5$ ............................................... C08K 5/04
[52] U.S. Cl. ..................................... 524/398; 524/399; 525/56; 525/57; 525/58; 525/61; 525/370
[58] Field of Search ................. 524/398, 399; 525/56, 525/57, 58, 61, 370

[56] References Cited

U.S. PATENT DOCUMENTS

| | | | |
|---|---|---|---|
| 3,674,768 | 7/1972 | Allum et al. | 525/61 |
| 3,890,267 | 6/1975 | Fukushima et al. | 525/130 X |
| 3,914,463 | 10/1975 | Mercurio et al. | 525/58 X |
| 3,992,487 | 11/1976 | Hemmerich et al. | 525/55 X |
| 4,602,062 | 7/1986 | Larkin | 525/61 |
| 4,835,214 | 5/1989 | Shepherd et al. | 525/58 |
| 4,931,488 | 6/1990 | Chiquet | 524/398 X |

Primary Examiner—Bernard Lipman
Assistant Examiner—J. M. Reddick
Attorney, Agent, or Firm—Armstrong & Kubovcik

[57] ABSTRACT

The saponified product of an ethylene-vinyl acetate copolymer is mixed with an oxidation catalyst to provide a resin composition having improved oxygen barrier quality. For better formability, the composition may be mixed or laminated with another thermoplastic resin such as a polyester.

7 Claims, No Drawings

RESIN COMPOSITION HAVING OXYGEN BARRIER QUALITY

BACKGROUND OF THE INVENTION

This invention relates to a resin composition having oxygen barrier quality.

The saponified product of an ethylene-vinyl acetate copolymer is thermoplastic and can be shaped by various methods including melt extrusion molding, injection molding and blow molding. In addition, this product has excellent oxygen barrier quality and hence is used extensively in packaging films, bottles, etc. However, even such saponified product of an ethylene-vinyl acetate copolymer does not completely prevent oxygen permeation and permits a certain amount of permeation. It is therefore desired to develop a material that uses the saponified product of an ethylene-vinyl acetate copolymer and which yet has better oxygen barrier quality.

SUMMARY OF THE INVENTION

The present invention has been accomplished under these circumstances and has as an object providing a resin composition having better oxygen barrier quality.

This object of the present invention can be attained by a resin composition having oxygen barrier quality that comprises the saponified product of an ethylene-vinyl acetate copolymer (EVOH) and an oxidation catalyst.

DETAILED DESCRIPTION OF THE INVENTION

The oxidation catalyst used in the present invention may be of any type that promotes the oxidation of EVOH in such a way that EVOH reacts with the oxygen that would otherwise permeate through EVOH, thereby improving its oxygen barrier quality. Preferred examples of such oxidation catalyst are metal catalysts that comprise compounds of transition metals. Transition metals would work as an oxidation catalyst as oxygen reacts with EVOH in the process of transition of metal ions from an oxidized state to a reduced state and vice versa. Preferred transition metals include Co, Mn, Fe, Cu, Ni, Ti, V and Cr, with Co being particularly preferred. Compounds of those metals may be salts with organic acids. Exemplary salt forming organic acids include stearic acid, acetylacetonic acid, dimethyldithiocarbamic acid, linoleic acid and naphthenic acid.

Aluminum compounds can also be used as an oxidation catalyst for the principal reason of low price.

The composition of the present invention may be shaped per se but for better formability, it is desirably used in combination with other thermoplastic resins such as polyolefin resins (e.g. polyethylene and polypropylene), polyester resins, polyvinyl chloride resin and polyvinylidene chloride resin. If such resins are to be used, EVOH preferably accounts for at least 4 wt % of the total resin content.

The composition of the present invention desirably contains the oxidation catalyst in such an amount that at least $0.001 \times 10^{-2}$ part by weight, preferably at least $0.01 \times 10^{-2}$ part by weight, of a metal element is present per part by weight of EVOH. Other thermoplastic resins, if used at all, may be present in amounts of up to 100 parts by weight.

The composition of the present invention which optionally contains thermoplastic resins other than EVOH can be shaped by known thermal forming methods such as melt extrusion molding. Sheets of pipes can be formed by melt extrusion molding. Sheeting can be used as lids on bags or containers for packaging foods and other materials. Piping may be cut at both ends, which are fitted with metallic or resin lids to make containers. The composition can also be shaped by injection molding, which is a well-known technique for shaping containers, etc. If desired, bottles may be formed by blow molding. Parisons or preforms for use in blow molding can be formed by the above-described melt extrusion molding or injection molding.

Whichever of those forming methods may be used, a layer of another thermoplastic resin may be provided on one or both sides of the shaped part of the composition of the present invention. Examples of such optional thermoplastic resins include polyesters, polyolefins, polyamides, polyvinyl chloride, polyvinylidene chloride, polyacrylonitrile, polycarbonate, and modified products of these resins.

The following examples are provided for the purpose of further illustrating the present invention but are in no way to be taken as limiting.

EXAMPLE 1

One part by weight of EVOH having an ethylene content of 47 mol % and a saponification degree of at least 96% was mixed with cobalt (II) stearate in an amount of $0.025 \times 10^{-2}$ part by weight in terms of cobalt element and 25 parts by weight of a polyester. The mixture was injection-molded at a resin temperature of 270° C. to make a preform. The preform was streched and blow-molded to produce bottle sample No. 1. The resin temperature during the blow molding was ca. 90° C. and the streched ratio was 1.9 (bottle height/preform height) and 3.0 (bottle diameter/preform diameter). The bottle had an average wall thickness of 0.3 mm, a capacity of 900 ml and a surface area of 0.058 m$^2$.

EXAMPLE 2

Bottle sample No. 2 was produced by repeating the procedure of Example 1 except that cobalt (II) stearate was used in such an amount as to provide $0.25 \times 10^{-2}$ part by weight of cobalt element.

EXAMPLE 3

Bottle sample No. 3 was produced by repeating the procedure of Example 1 except that the preform was prepared by injection molding a mixture of one part by weight of EVOH, $0.1 \times 10^{-2}$ part by weight in terms of cobalt element of cobalt (II) stearate and 100 parts by weight of a polyester at a resin temperature of 270° C.

EXAMPLE 4

Bottle sample No. 4 was produced by repeating the procedure of Example 1 except that cobalt stearate was replaced by aluminum acetylacetonate that was used in such an amount as to provide $0.25 \times 10^{-2}$ part by weight of aluminum element.

EXAMPLE 5

Bottle sample No. 5 was produced by repeating the procedure of Example 1 except that cobalt stearate was replaced by aluminum stearate that was used in such an amount as to provide $0.25 \times 10^{-2}$ part by weight of aluminum element.

EXAMPLE 6

Bottle sample No. 6 was produced by repeating the procedure of Example 1 except that cobalt stearate was replaced by aluminum stearate that was used in such an amount as to provide $0.75 \times 10^{-2}$ part by weight of aluminum element.

EXAMPLE 7

Bottle sample No. 7 was produced by repeating the procedure of Example 1 except that cobalt stearate was replaced by iron (III) dimethyldithiocarbamate that was used in such an amount as to provide $0.25 \times 10^{-2}$ part by weight of iron element.

COMPARATIVE EXAMPLE 1

Comparative sample No. 1 was produced by repeating the procedure of Example 1 except that no oxidation catalyst was used.

The oxygen permeabilities of bottle sample Nos. 1-7 and comparative sample No. 1 were measured by the Mocon method at predetermined times and the results are shown in Table 1 below.

TABLE 1

| Sample No. | Catalyst | Metal concentration, $\times 10^{-2}$ part | Oxygen permeability | | | | |
|---|---|---|---|---|---|---|---|
| | | | 1 day | 2 wk | 1 mo. | 2 mo. | 3 mo. |
| 1 | Co | 0.025 | 4.78 | 4.26 | — | — | — |
| 2 | Co | 0.25 | 6.20 | 2.17 | 0.51 | 0.12 | 0.09 |
| 3 | Co | 0.1 | 7.83 | 7.48 | — | — | — |
| 4 | Al | 0.25 | 5.39 | 5.22 | — | — | — |
| 5 | Al | 0.25 | 6.61 | 5.65 | — | — | — |
| 6 | Al | 0.75 | 4.43 | 4.07 | — | — | — |
| 7 | Fe | 0.25 | 1.65 | 1.91 | — | — | — |
| Comparison 1 | — | — | 8.30 | 8.31 | 8.37 | 8.26 | 8.29 |

In Table 1, only the metal component is shown for the oxidation catalysts and the values of oxygen permeability are shown in milliliters per square meter at one atmosphere. (ml/m²·atm).

EXAMPLE 8

A three-layered preform was prepared by multi-layer injection molding. The inner and outer layers were made of a polyester whereas the intermediate layer was made of a composition that was a mixture of one part by weight of EVOH and cobalt (III) stearate that was used in such an amount as to provide $0.01 \times 10^{-2}$ part by weight of cobalt element. The preform was stretched and blow-molded to produce bottle sample No. 8. The bottle had oval cross-sectioned shape and had an average wall thickness of 0.48 mm (intermediate composition layer: 0.06 mm), a capacity of 250 ml and a surface area of 0.03 m².

EXAMPLE 9

Bottle sample No. 9 was produced by repeating the procedure of Example 8 except that cobalt stearate was replaced by aluminum stearate that was used in such an amount as to provide $0.01 \times 10^{-2}$ part by weight of aluminum element.

COMPARATIVE EXAMPLE 2

Comparative sample No. 2 was produced by repeating the procedure of Example 8 except that no oxidation catalyst was used.

The oxygen permeabilities of bottle sample Nos. 8 and 9 and comparative sample No. 2 were measured by the Mocon method at predetermined times and the results are shown in Table 2 below, in which only the metal component is shown for the oxidation catalysts and the values of oxygen permeability are shown in milliliters per square meter at one atmosphere (ml/m²·atm).

TABLE 2

| Sample No. | Catalyst | Metal concentration, $\times 10^{-2}$ part | Oxygen permeability | | | | | |
|---|---|---|---|---|---|---|---|---|
| | | | 1 day | 1 wk | 2 wk | 1 mo. | 2 mo. | 4 mo. |
| 8 | Co | 0.01 | 0.81 | 0.55 | 0.52 | 0.60 | 0.57 | 0.51 |
| 9 | Al | 0.01 | 1.41 | 1.28 | 1.12 | 1.19 | 1.11 | 1.25 |
| Comparison 2 | — | — | 1.50 | 1.52 | 1.47 | 1.61 | 1.54 | 1.51 |

EXAMPLE 10

A five-layered container was produced by multi-layer injection molding. The layer arrangement consisted, with the outermost layer mentioned first, of polypropylene/polyolefinic adhesive resin/composition of one part by weight of EVOH mixed with cobalt stearate in an amount of $0.05 \times 10^{-2}$ part by weight in terms of cobalt element/polyolefinic adhesive resin/polypropylene. The thickness of the intermediate composition layer was 0.06 mm and the total wall thickness was 1 mm. The container had a surface area of 0.018 m².

COMPARATIVE EXAMPLE 3

Comparative Sample No. 3 was produced by repeating the procedure of Example 10 except that no oxidation catalyst was used.

The oxygen permeabilities of bottle sample No. 10 and comparative sample No. 3 were measured by the Mocon method at predetermined times and the results are shown in Table 3 below.

TABLE 3

| Bottle sample | Catalyst | Metal concentration, $\times 10^{-2}$ part | Oxygen permeability | | |
|---|---|---|---|---|---|
| | | | 5 days | 1 mo. | 8 mo. |
| 10 | Co | 0.05 | 0.56 | 0.47 | 0.47 |
| Comparison 3 | — | — | 0.79 | 0.82 | 0.72 |

In Table 3, only the metal component is shown for the oxidation catalyst and the values of oxygen permeability are shown in milliliters per square meter at one atmosphere (ml/m²·atm).

As is apparent from the foregoing description, the present invention is capable of providing EVOH-containing compositions having excellent oxygen barrier quality.

What is claimed is:

1. A resin composition having oxygen barrier quality that comprises an oxidation catalyst comprising a salt of an organic acid and a metal element selected from the group consisting of Ti, V, Cr, Mn, Fe, Co, Ni, Cu and Al and a saponified product of an ethylene-vinyl acetate copolymer.

2. A resin composition according to claim 1 wherein the metal element is cobalt.

3. A resin composition according to claim 1 wherein the metal element is aluminum.

4. A resin composition according to claim 1 wherein the oxidation catalyst is contained in such an amount that a metal element is present in an amount of at least $0.001 \times 10^{-2}$ part by weight per part by weight of the saponified product of an ethylene-vinyl acetate copolymer.

5. A resin composition according to claim 1 wherein the saponified product of an ethylene-vinyl acetate copolymer is contained in an amount of at least 4 wt % of the total resin content.

6. A resin composition according to claim 1 which further contains a thermoplastic resin.

7. A resin composition according to claim 6 wherein the thermoplastic resin is a polyester resin.

* * * * *